United States Patent Office 3,630,967
Patented Dec. 28, 1971

3,630,967
URANIUM OXIDE CATALYST
Thomas Nicklin, Middleton, Joseph Clack, Formby, and Kenneth Harold Burgess, Handforth, England, assignors to The Gas Council, London, England
No Drawing. Filed June 19, 1967, Ser. No. 647,245
Claims priority, application England, June 21, 1966, 27,578/66
Int. Cl. B01j *11/32, 11/36*
U.S. Cl. 252—465                   15 Claims

ABSTRACT OF THE DISCLOSURE

The invention provides a process for the preparation of a catalyst, which process comprises subjecting a composition comprising a first component, together with a second component, disposed on a catalyst support to at least two reduction-oxidation cycles, said first component being selected from the group consisting of uranoso-uranic oxide, uranium trioxide and a mixture thereof and said second component being selected from the group consisting of nickel, nickel oxide or a mixture thereof. The invention also provides a catalyst when prepared by the method.

---

The present invention relates to a process for the preparation of improved catalyst compositions comprising uranoso-uranic oxide, $U_3O_8$, and/or uranium trioxide, $UO_3$. Catalysts comprising one or both of the said oxides and processes employing the same are described and claimed in British patent specifications Nos. 1,049,918 and 1,039,206.

According to the present invention, there is provided a process for the preparation of a catalyst, which process comprises subjecting a composition comprising uranoso-uranic oxide and/or uranium trioxide, together with nickel and/or nickel oxide, disposed on a catalyst support to at least one reduction-oxidation cycle.

"Uranoso-uranic oxide" is the mixed oxide $U_3O_8$, which is also referred to in some publications as Triuranium octa-oxide (see for example "Handbook for Chemical Society Authors," page 22, published by the Chemical Society in 1960).

The reduction-oxidation cycle is conveniently effected with a reduction step in the presence of a reducing gas followed by an oxidation step in the presence of an oxidising gas.

Preferably the composition comprising uranoso-uranic oxide and/or uranium trioxide, together with nickel and/or nickel oxide is subjected to at least two, more preferably from four to six, reduction-oxidation cycles.

During the oxidation step nickel uranate is formed which is reduced to very finely divided nickel during the reduction step. Nickel uranate decomposes at a temperature of about 900° C. and it is preferred to carry out the oxidation step at a temperature at which no significant decomposition of the nickel uranate takes place. Accordingly, in one embodiment of the invention the or each oxidation step may be carried out at a temperature not exceeding 800° C. It is particularly preferred that the or each oxidation step is carried out at a temperature of from 600° C. to 650° C.

The or each reduction step may be carried out at a temperature not exceeding 600° C., preferably not exceeding 550° C. It is particularly preferred to carry out the or each reduction step at a temperature not exceeding 520° C.

The successive reduction and oxidation steps may be carried out under the following conditions. Reduction of the catalyst may be carried out using a reducing gas preferably hydrogen at a temperature in the range of 400° C. to 600° C., preferably 450° C. to 520° C. The subsequent oxidation step may be carried out using a gas comprising oxygen or an oxidising gas, i.e. one which will yield oxygen under the conditions of the oxidation step at controlled temperatures not exceeding 800° C., preferably in the range 600° C. to 650° C.

The periods of time during which the successive reduction and oxidation steps are carried out will depend upon the conditions used, the flow of reducing and/or oxidising gases as the case may be, and the quantities of catalyst to be treated. We have found that as the successive reduction and oxidation cycles proceed the oxidation reaction when using the same concentration of oxygen or oxidising gas during the oxidation step tends to become more vigorous. In general, the first oxidation step may be carried out using air. After a number of successive reduction and oxidation steps the oxidation reaction using a gas having the same proportion of oxygen or oxidising gas present becomes increasingly vigorous. If air is used throughout the process the result will be eventually to render the catalyst pyrophoric. It is therefore desirable progressively to reduce the concentration of oxygen and/or oxidising gas present during the oxidation step as the successive cycles of reduction and oxidation steps proceed.

It has been found advantageous to use a catalyst which has been prepared using 4, 5 or 6 reduction-oxidation cycles. The period of time taken by each reduction and oxidation step during each cycle will vary according to the conditions used. For the purpose of commercial preparation a period of up to 12 hours, preferably between one and eight hours per step may be used, more preferably between 3 and 5 hours and advantageously about 4 hours. The preferred reducing gas used is hydrogen. The preferred concentration is 100%, and a reducing gas of this composition may be used throughout the successive cycles. It is not necessary to supply the hydrogen at a rate which is any higher than that which would be required to maintain a hydrogen rich condition at the outlet of the reducing vessel. On the other hand when carrying out the oxidation step in any particular cycle, the proportion of oxygen or oxidising gas employed should be controlled so that the oxidation reaction proceeds at the controlled temperature conditions and does not exceed the upper limit set out above.

The catalyst composition comprising uranoso-uranic oxide and/or uranium trioxide according to an aspect of the present invention may be constituted by a catalyst carrier on the surface of which has been formed or deposited such oxide or oxides of uranium. The carrier may for example be constituted by alumina, an alkaline earth metal oxide, silica, magnesium silicate, powdered brick or mixtures of the foregoing. The term "carrier" as used herein is not limited to the foregoing examples: thus the carrier may be any substance having the desired properties of a catalyst carrier for use in the particular reaction for which it is intended as is well known in the art, i.e. mechanical strength and resistance to physical or chemical change under the conditions of the reaction in question.

The catalysts prepared in accordance with the present invention may contain from ½% to 70% of nickel. Preferably the catalyst comprises uranium and nickel in a ratio of at least 2 moles of uranium per mole of nickel.

According to the present invention there is also provided a catalyst composition when made by any of the processes herein described.

The present invention further provides a process for steam reforming hydrocarbons resulting in the production of gas mixtures containing oxides of carbon and hydrogen wherein the catalyst, in the presence of which the hydrocarbon feed is reacted with steam, has been prepared in accordance with the process of the present invention.

The conditions employed in such a reforming process using the catalyst prepared according to the present invention (including the pressures and temperatures employed and the proportions of reagents used and of nickel component and uranium component present in the catalyst, and the preferred ranges of the foregoing) may be the same as are set out in the processes described and claimed in the British patent specification No. 1,039,206.

Furthermore the present invention also includes within its scope a modification of the process for steam reforming of hydrocarbons set out above wherein the catalyst comprises a catalyst carrier constituted by uranoso-uranic oxide and/or uranium trioxide, together with nickel and/or nickel oxide on the surface thereof, and wherein the uranium component has been subjected to the successive reduction-oxidation treatment of the present invention. In such a catalyst the nickel content may advantageously vary from ½ percent to 70 percent.

The process of the present invention has application in relation to several catalyst compositions comprising uranoso-uranic oxide and/or uranium trioxide, together with nickel and/or nickel oxide, and the methods for the preparation thereof. There are set out below several alternative applications of the process:

The composition to be subjected to the reduction-oxidation process in accordance with the present invention may consist of a catalyst or catalyst composition for use in a steam reforming process or in a hydrodesulphiding process, such as those set out in British patent specification No. 1,039,206. The composition may include, cobalt or cobalt oxide in the case of a hydrodesulphiding catalyst. The process of the present invention, when applied to such catalysts, confers upon the catalysts an enhanced activity.

Alternatively, the composition subjected to the process of the present invention may be a catalyst for use in steam desulphiding reactions which comprises uranoso-uranic oxide and/or uranium trioxide and a support such as lumina, silica, kaolin, magnesium silicate, powdered brick or an oxide of magnesium, calcium, strontium or barium.

Alternatively, the composition subjected to the process of the present invention may consist of a catalyst constituted by uranoso-uranic oxide and/or uranium trioxide acting as a carrier and having deposited thereon nickel and/or nickel oxide, optionally together with another constituent such as cobalt and/or cobalt oxide. Such a catalyst may be usefully employed in steam hydrodesulphiding reactions.

When the catalyst is to be used to reform hydrocarbon distillates boiling at a temperature of above 120° C., it is preferred to incorporate therein an alkali metal compound preferably potassium or lithium oxide or else a compound which, under the conditions of the steam reforming reaction will decompose to yield such oxide, e.g. the hydroxide, nitrate or acetate.

Where, as mentioned above, the uranoso-uranic oxide and/or uranium trioxide itself constitutes the catalyst carrier, it is preferred that it be subjected to the process of the present invention in the form of granules of pellets.

The process of the present invention provides an enhanced activity for the catalyst as mentioned above however produced. Thus the relevant oxide or oxides of uranium may be already deposited on the surface of a carrier as described above by the decomposition of the nitrate. A particularly advantageous catalyst is obtained where the oxide or oxides of uranium result from the decomposition of a uranium salt of an organic carboxylic acid, e.g. the oxalate, formate or preferably the acetate under controlled temperature conditions such as at a temperature not exceeding 650° C. Such decomposition may occur on the surface of a catalyst carrier which has been impregnated with the uranium carboxylate salt in question. Alternatively, the oxide or oxides of uranium may be mixed with a carrier in finely divided form together with, for example, nickel oxide, which may have been formed by simultaneous decomposition of a mixture of uranium and nickel salts, pelleted and then subjected to the process of the present invention. Where it is proposed to treat according to the present invention a catalyst constituted by nickel and/or nickel oxide, optionally together with cobalt and/or cobalt oxide, on a carrier constituted by the uranoso-uranic oxide and/or uranium trioxide, the composition to be treated may be prepared by the decomposition of mixed salts of uranium and nickel, and/or cobalt as the case may be, e.g. their nitrates or advantageously, their acetates, and the product crushed and then pelleted before treatment.

A uranium catalyst formed by a process which includes the step of the decomposition of a uranium carboxylate will be given a still further enhanced activity by the process of the present invention.

It has been found that using a catalyst made according to the present invention, the amount of nickel which is required, for example in steam reforming, to provide a catalyst of comparable activity is materially reduced. In one particular application it has been found that an alumina/uranium oxide/nickel catalyst prepared according to the present invention and comprising as little as 5% nickel present on the catalyst behaved when used in a steam reforming process to give rich gas, in a manner very similar to an alumina/nickel catalyst having 70% nickel present on the catalyst.

The preparation of a catalyst in accordance with the process of the present invention will now be illustrated with reference to the following examples:

Example I 6 litres of alumina (corundum) granules (4–6 mm. diameter) were soaked for half an hour in a melt of nickel, uranyl nitrates made by melting together 2 parts of nickel nitrate to 1 part of uranyl nitrate. The granules were removed from the melt and drained for ¼ hour before being calcined at 400° C. for 4 hours in a stream of air. After this initial calcination the material was subjected to an alternate reduction oxidation cycle each of 3 hours duration at a temperature of 400° C. for the oxidation and 500° C. for the reduction cycle. During the oxidation cycles the oxygen content of the oxidising atmosphere was progressively reduced so as to control the pyrophoric nature of the catalyst. 6 reduction cycles were carried out and 6 oxidation cycles so that the catalyst prepared was in the oxdised form. The final composition of the catalyst was nickel 4.29% and uranium 5.07%.

The reforming of a mixture of hydrocarbons with steam in the presence of a catalyst prepared in accordance with the present invention will now be illustrated with reference to the following examples:

Example II

A catalyst prepared as in Example I was placed in a tube and reduced with hydrogen at 500° C. before being put to work as follows.

Reactants consisting of light virgin naphtha and steam were fed to the reactor at an inlet temperature of 505° C. and at rates of 1.83 g./hr. naphtha to 30 lb./hr. steam and at 240 p.s.i.g. plant pressure, 405 c.f.h. gas was made with an average composition of 51% $CH_4$ trace CO and 21.5% $CO_2$. The system completed 180 hours in this manner when the reactant rates were increased to 3.2 g./hr. naphtha and 59 lbs./hr. steam with no evidence of slip. An average tube inlet temperature of 512° C. was used and over 740 c.p.h. gas was made with an average analysis of 46.6% $CH_4$, 1.1% CO and 22.2% $CO_2$.

The reactants were then fed to the reactor at rates of 1.78 g./hr. light virgin naphtha to 30.5 lbs./hr. steam. In this example however the temperatures were raised so that a tube outlet of 600° C. was attained 490 c.f.h. of gas of composition $CH_4$ 35.2%, CO 3.4, $CO_2$ 22.8% was made. Plant pressure during the run was 230 p.s.i.g.

We claim:

1. In a process for the preparation of an activated steam reforming catalyst comprising alumina and oxides of nickel in the proportion of about 4.29% and uranium in the proportion of about 5.07%, both based on the metal, the improvement which comprises subjecting a composition, comprising a first component consisting of uranium trioxide, uranoso-uranic oxide, and mixtures thereof and a second component selected from the group consisting of nickel oxide and a mixture of nickel and nickel oxide, disposed on an alumina support, to at least two reduction-oxidation cycles, each reduction step being conducted at a temperature of from 400° C., to 600° C., and each oxidation step being conducted at a temperature of not over 800° C.

2. A process as claimed in claim 1 wherein the composition is subjected to from four to six reduction-oxidation cycles.

3. A process as claimed in claim 1 wherein the temperature during each oxidation step is maintained in the range of from 600° C. to 650° C.

4. A process as claimed in claim 1 wherein the temperature during each reduction step is maintained in the range of from 450° C. to 520° C.

5. A process as claimed in claim 1 wherein each of the reduction and oxidation steps during each reduction-oxidation cycle takes from one to eight hours.

6. A process as claimed in claim 1 wherein each of the reduction and oxidation steps during each reduction-oxidation cycle takes from three to five hours.

7. A process as claimed in claim 1 wherein each of the reduction steps is carried out in an atmosphere consisting essentially of hydrogen.

8. A process as claimed in claim 1 wherein the first oxidation step is carried out in an atmosphere of air.

9. A process as claimed in claim 1 wherein the concentration of oxidising agent present during the oxidation steps is reduced for each successive reduction-oxidation cycle.

10. A process as claimed in claim 1 wherein the composition is formed by mixing the first component together with the second component and the alumina and the resulting mixture is pelletised.

11. A process as claimed in claim 1 wherein the composition is formed by impregnating the alumina with a nickel salt and a uranium salt and decomposing the nickel salt and uranium salt.

12. A process as claimed in claim 11 wherein the nickel salt is selected from the group consisting of a nitrate of nickel and a nickel salt of an organic carboxylic acid.

13. A process as claimed in claim 11 wherein the uranium salt is selected from the group consisting of a nitrate of uranium and a uranium salt of an organic carboxylic acid.

14. A process as claimed in claim 12 wherein the nickel salt is a salt selected from the group consisting of salts of oxalic, formic and acetic acid.

15. A process as claimed in claim 13 wherein the uranium salt is a salt selected from the group consisting of salts of oxalic, formic and acetic acid.

References Cited

UNITED STATES PATENTS 2,965,561    12/1960    Carr _____ 208—65

DANIEL E. WYMAN, Primary Examiner

P. M. FRENCH, Assistant Examiner

U.S. Cl. X.R.

252—470